Oct. 18, 1927.
H. B. BOIES
1,645,788
COMBINATION TIRE PUMP AND GAUGE
Filed Nov. 6, 1925
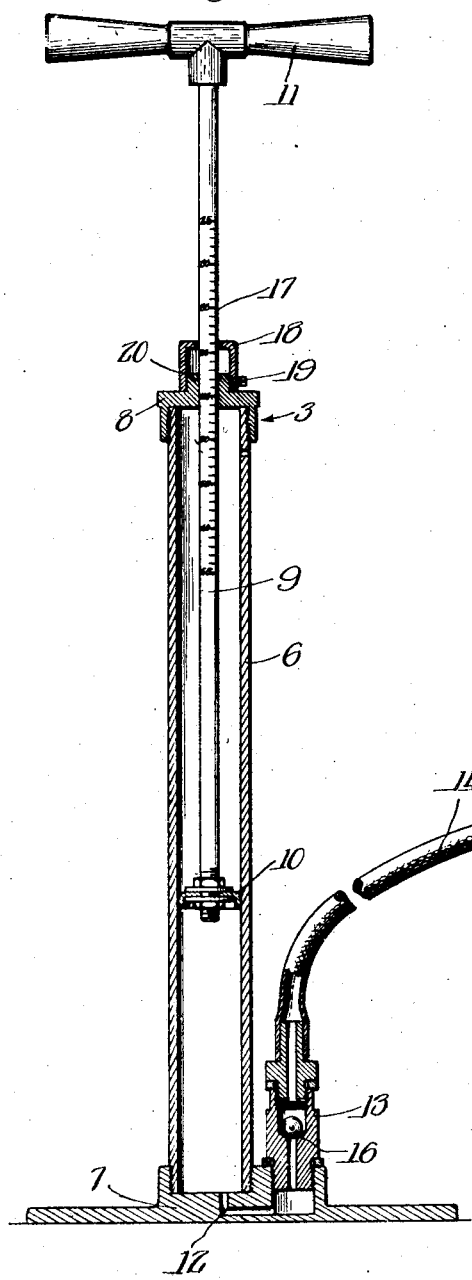
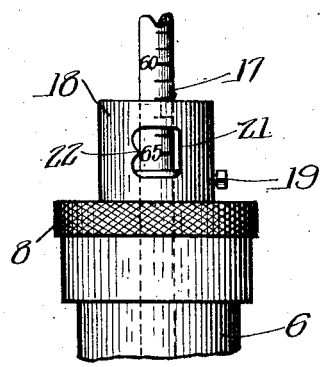
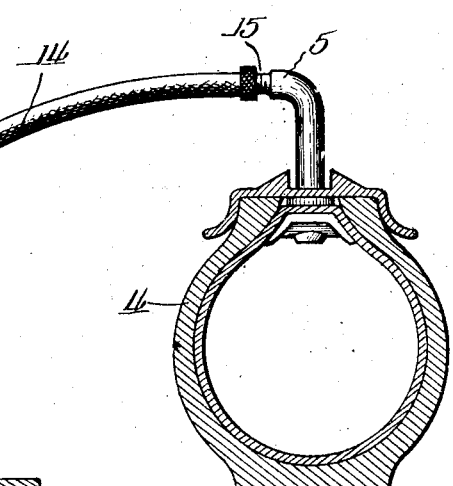
Inventor.
H. B. Boies,
By Chindahl, Pardus Carlson
Attys.

Patented Oct. 18, 1927.

1,645,788

UNITED STATES PATENT OFFICE.

HARRY B. BOIES, OF HARVEY, ILLINOIS.

COMBINATION TIRE PUMP AND GAUGE.

Application filed November 6, 1925. Serial No. 67,213.

The object of this invention is to provide in combination with a tire pump of the hand operated type, a gauge operable to register the air pressure in the tire.

More specifically, the object is to utilize the rebound of the piston rod of the pump for registering the air pressure in the tire, by the provision of a graduated scale on the rod which is so calibrated as to indicate the air pressure in the tire in pounds depending upon the extent of the rebound.

In the accompanying drawings,

Figure 1 is a vertical sectional view through a hand operated tire pump of ordinary construction shown connected to an automobile tire and embodying my invention.

Fig. 2 is a fragmentary side elevational view on an enlarged scale illustrating a preferred form of indicator for use in connection with the graduated scale on the piston rod.

In the embodiment selected for illustration, 3 designates generally a tire pump connected with an automobile tire 4 having the usual air valve stem 5. The pump comprises the usual cylinder or barrel 6 mounted in a base 7 closed at its upper end by means of a screw cap 8 centrally apertured to receive the pump or piston rod 9. The latter carries at its lower or inner end the usual plunger or piston 10 and at its upper end a handle 11. In the base 7 an outlet opening 12 is provided which is connected by means of a suitable fitting 13 with one end of a flexible hose 14, the other end of the hose being provided with a fitting 15 for connection with the valve stem. 16 indicates a check valve in the fitting 13.

I utilize, in carrying out my invention, the pressure built up ahead of the plunger or piston 10 in the operation of inflating a tire to indicate the pressure in the tire, and I have found that the pressure thus required to be built up to overcome the pressure in the tire produces a reaction upon the piston or plunger, when the handle 11 of the pump is released at the end of the stroke, which is substantially constant for any given tire pressure. Accordingly, I have provided on the pump rod 9 a scale 17 which is so calibrated as to measure in pounds the pressure existing in the tire, depending upon the extent of the reaction or rebound of the piston or plunger. Preferably, I provide an indicator for use in connection with the scale 17 which may be adjusted vertically at will in order to compensate for varying conditions surrounding the use of the pump such, for example, as leakage due to wear. This indicator in the present instance is in the form of a sleeve 18 adjustably secured as by means of a set screw 19 onto a boss 20 which is formed on the upper end of the cap 8. This sleeve has in one wall an aperture 21 through which the scale 17 on the rod is visible, and preferably one wall of the slot is shaped to provide a pointer 22.

In the use of the pump when the operator desires to ascertain the pressure to which the tire has been inflated, he merely releases the handle suddenly at the end of the down stroke, and the resulting rebound of the plunger and hence of the pump rod 9 will indicate according to the extent of such rebound substantially the amount of pressure existing in the tire. Obviously, the calibration of the scale will in the case of different types of pumps vary with the construction and arrangement employed. Thus the volumetric capacity of the chambers and passages between the piston (in its lowermost position) and the valve 16 will vary with the construction; and I have found that in some instances the check valve at the outlet of the pump permits of some leakage of air so that the pressure between this valve and the tire valve must be taken into consideration. On the other hand, if the check valve 16 is constructed to prevent leakage, the controlling factor is the air trapped under pressure between this valve and the piston.

Thus it will be observed that I have produced an exceedingly simple device for registering the air pressure in a tire or other pressure chamber, which is so associated with the inflating pump as to impart the desired information without necessitating the removal of the pump connection and the application of the gauge in the usual way.

I claim as my invention:

1. A combined pump and gauge of the character described comprising, in combination, a tubular barrel having an outlet adapted for connection with a pressure chamber, a non-return valve in said outlet, a piston and a piston rod manually operable in the barrel, said rod having arranged longitudinally thereof a scale calibrated so as to indicate substantially the pressure in said chamber in accordance with the rebound of the piston and rod due to the reaction of pressure upon the under side of the piston when the rod is released by the operator.

2. A pump of the class described having a barrel with an outlet adapted for communication with a tire or other chamber, a one-way valve intermediate said outlet and said chamber to prevent the escape of air from said chamber, a piston operable in said barrel, and a piston rod having said piston secured to its lower end within said barrel and a handle secured to its upper end externally of the barrel, said rod having arranged longitudinally thereof a scale so calibrated as to indicate the air pressure in the tire in accordance with the extent to which the rod is caused to rebound, when released by the operator, by reason of the reaction of pressure built up ahead of the piston to overcome the pressure in the tire.

3. A pump of the class described having a barrel with an outlet adapted for communication with a tire or other chamber, a one-way valve intermediate said outlet and said chamber to prevent the escape of air from said chamber, a piston operable in said barrel, and a piston rod having said piston secured to its lower end within said barrel and a handle secured to its upper end externally of the barrel, said rod having arranged longitudinally thereof a scale so calibrated as to indicate the air pressure in the tire in accordance with the extent to which the rod is caused to rebound when released by the operator by reason of the reaction of pressure built up ahead of the piston to overcome the pressure in the tire, said barrel having at its upper end an adjustable indicator adapted to coact with said scale.

In testimony whereof, I have hereunto affixed my signature.

HARRY B. BOIES.